United States Patent [19]

Evans et al.

[11] Patent Number: 5,294,471
[45] Date of Patent: Mar. 15, 1994

[54] OPTICAL INFORMATION RECORDING MEDIUM USING METALLIZED FORMAZAN DYES

[75] Inventors: Steven Evans; Csaba A. Kovacs, both of Rochester, N.Y.

[73] Assignee: Eastman Kodak Company, Rochester, N.Y.

[21] Appl. No.: 11,606

[22] Filed: Feb. 1, 1993

[51] Int. Cl.$^5$ .................................................. B32B 3/00
[52] U.S. Cl. .......................................... 428/64; 428/65; 428/457; 428/913; 430/270; 430/945; 346/76 L; 346/135.1
[58] Field of Search .................... 428/64, 65, 457, 913; 430/270, 945; 346/76 L, 135.1

[56] References Cited

U.S. PATENT DOCUMENTS

| | | | |
|---|---|---|---|
| 4,940,618 | 7/1990 | Hamada et al. | 428/64 |
| 5,024,923 | 6/1991 | Suzuki et al. | 430/372 |
| 5,155,723 | 10/1992 | Hamada et al. | 369/284 |

FOREIGN PATENT DOCUMENTS

| | | | |
|---|---|---|---|
| 2005520 | 12/1989 | Canada | 260/237.2 |
| 62-144997 | 6/1987 | Japan . | |

Primary Examiner—Patrick J. Ryan
Assistant Examiner—Elizabeth Evans
Attorney, Agent, or Firm—J. Jeffrey Hawley

[57] ABSTRACT

There is disclosed a recordable optical element that includes a metallized dye. The element has a transparent substrate and on the surface of the substrate, a dye containing recording layer and a light reflecting layer. The improvement is that the dye is a metal complex of a metallized formazan dye. The dyes that are used in the element are very light stable.

17 Claims, No Drawings

OPTICAL INFORMATION RECORDING MEDIUM USING METALLIZED FORMAZAN DYES

FIELD OF THE INVENTION

The present invention relates to optical recording materials. The materials are particularly useful in making recordable compact disks.

BACKGROUND OF THE INVENTION

There are many types of optical recording materials that are known. In many of the materials, the mode of operation requires that the unrecorded material have a high absorption and that the recorded areas, often referred to as pits, have low optical density or high reflection. The high reflection pits are made by ablating away the high absorption recording material, usually exposing an underlying reflective support.

One of the currently popular forms of optical storage of information is the compact disk or CD. Digital information is stored in the form of high optical density marks or pits on an otherwise reflective background, the exact opposite of the above described optical recording materials. In this format, the optical information is most often in the form of read only memory or ROM. Optical information is not usually recorded in real time but rather is produced by press molding. In a typical process, the optical recording substrate is first press molded with a master containing the digital information to be reproduced. The thus formed information is then overcoated with a reflective layer and then with an optional protective layer. In those areas having the deformations or pits, the optical density is higher than in those areas not having the deformations.

In Japanese KOKAI 62-144997 there is described an optical recording element having a recording layer having a formazan-nickle complex. However, all of the complexes disclosed in this reference are bidentate and have a poor index of refraction at about 780 nm and a low extinction coefficient.

It is desirable to produce optical recording media which, when recorded in real time, produces a record that mimics the conventional CD on read out. Read out is at about 780 nm. In this manner, information can be added to the CD and the CD can be used on a conventional CD player.

One recently disclosed system of this type is the so called "Photo CD". In this system, conventional photographic film is first processed in a conventional manner. Then, the images from the film are digitized and the digital information is recorded in a CD readable form on an optical recording material. Images can then be played back on a CD type player into a conventional television. Since a CD has a capacity for a number of digitized images that is greater than the typical roll of consumer film, it is anticipated that the user will want to add images to a preexisting CD. Thus the need for recordable, CD compatible optical recording material.

One method for forming a recordable element that mimics conventional mold pressed CD elements is to provide a heat deformable support having thereon, in order, a layer of a dye that absorbs recording radiation and a reflective layer. Exposure of the recording layer through the support by the recording beam heats the recording layer to an extent that it is said that the surface of the heat deformable support just adjacent to the recording layer surface is deformed. Materials of this type are described in U.S. Pat. No. 4,940,618, European Patent Application 0,353,393 and Canadian Patent Application 2,005,520.

Commercially useful materials of the type described in these references have stringent requirements. One of these requirements is light stability. Since the Photo CD is a consumer product, it must be capable of withstanding extreme environments. Between the time the original images are recorded on the Photo CD and the time subsequent images are recorded, the CD might be placed in strong sunlight, for example. The recording layer must be very light stable for this purpose.

In the U.S. and the European applications mentioned above, the preferred dyes for the recording layer are indodicarbocyanine dyes. However, this type of dye has less than the desired light stability and will in fact fade to an unusable state in only a few days of intense sunlight.

Thus, there is a continuing need for optical recording materials that have the necessary optical characteristics so that they are CD compatible and yet are light stable. It is to a solution to this problem that the present invention is directed.

SUMMARY OF THE INVENTION

In accordance with the present invention there is provided a recordable optical element having a transparent substrate and on the surface of said substrate, a dye containing recording layer and a light reflecting layer, the improvement wherein said dye is a metallized formazan dye of the general structure:

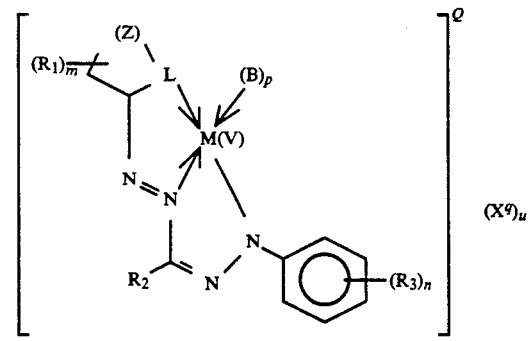

wherein:

Z are the atoms necessary to complete a 5 or 6 membered carbocyclic or heterocyclic ring;

each $R_1$ independently is a group selected from the group consisting of alkyl having about 1 to 20 carbon atoms; aryl having from about 6 to 10 carbon atoms; heteroaryl; alkenyl having from about 2 to 20 carbon atoms; halogen; thiocyano; cyano; nitro; sulfo; carboxy; hydroxy; alkoxy; aryloxy; hetaryloxy; alkylsulfonyl; arylsulfonyl; hetarylsulfonyl; arylazo; hetarylazo; alkoxycarbonyl; aryloxycarbonyl; alkoxycarbonylamino; aryloxycarbonylamino; alkoxycarbonyloxy; aryloxycarbonyloxy; alkylcarbonylamino; arylcarbonyloxy; hetarylcarbonyloxy; alkylcarbonylamino; arylcarbonylamino; hetarylcarbonylamino; mono- or di-alkylaminocarbonyloxy; mono- or di-arylaminocarbonyloxy; mono- or di-hetarylaminocarbonyloxy; mono- or di-alkylaminocarbonylamino; mono- or di-arylaminocarbonylamino; mono- or di-hetarylaminocarbonylamino; mono- or di- alkylcarbamoyl; mono or di arylcarbamoyl; alkyl or aryl carbamoyl;

mono- or di- alkylsulfamoyl; mono- or di-arylsulfamoyl; and alkylarylsulfamoyl.

$R_2$ represents an alkyl group having from 1 to about 20 carbon atoms; a heterocyclic group having from 1 to about 10 carbon atoms, an aromatic ring with H or $R_1$ substituents; CN; alkoxycarbonyl; $NO_2$; alkylsulfonyl; arylsulfonyl; carbamoyl; sulfamoyl;

each $R_3$ independently represents H or $R_1$ with the proviso that one of the $R_3$ groups may serve as a fourth ligand to the metal center, if located ortho to the azo linkage and chosen from O—, N—$SO_2R_4$ where $R_4$ can be an alkyl group with one to ten carbon atoms or aryl group with five to ten carbon atoms, $CO_2$—, $SO_3$— or —N=CH—;

m and n independently represent integers from 0 to 4;

L represents nitrogen or C—Y where Y represents a group capable of coordination to the metal ion such as O—, N—$SO_2R_4$ (where $R_4$ can be an alkyl group with one to ten carbon atoms or aryl group with five to ten carbon atoms) $CO_2$—, $SO_3$— or N=CH—.

M represents a complexing metal such as Ni, Pd, Zn, Cu, etc.

V is the charge (valence) of the coordinating metal ion;

X is a counter ion group balancing the charge Q on the metal complex such as a sodium ion, chloride ion, tetraalkylammonium, tetrafluoroborate, hexafluorophosphate etc.

q is the charge on the counter ion;

u is the number of counter ions required to balance the charge on the complex;

Q is the charge on the metal complex representing the difference between the metal valence (V) and the total anionic charge provided by the formazan dye and auxiliary ligand (B)p;

B is a ligand or ligands necessary to complete the coordination sphere of the metal ion and p is an integer from 0 to 3.

In preferred embodiments, L is nitrogen, Z represents the atoms necessary to complete a 6 membered ring, and at least one of $R_1$ represents an alkyl sulfamoyl group substituted with an alkyl group or an alkyl group containing an oxygen atom in the alkyl chain and another of $R_1$ is a group selected from the group consisting of alkyl, alkoxy and halogen; and $R_2$ is an alkyl group or an aromatic group optionally substituted with a group selected from alkyl and alkoxy.

The recordable elements of the present invention have optical properties such that they are CD compatible, that is, a good index of refraction at 780 nm and have excellent light stability as will be seen from the data presented in the Examples.

DETAILED DESCRIPTION OF THE INVENTION

In accordance with the invention, the optical recording element has a dye recording layer that includes the metallized formazan dye described above. Mixtures of the described dyes as well as mixtures of the described dyes with dyes of other classes are also contemplated.

In the descriptions above, alkyl can be a straight or branched chain group having up to about 10 carbon atoms such as methyl, ethyl or isopropyl. The alkoxy group can be, for example, ethoxy or butoxy. The aryl group can be, for example, phenyl, aminophenyl or propionylaminophenyl. The heteroaryl group can be, for example, 2-pyridyl or 2-furyl.

Also in the description above various substituents are also contemplated. Thus, the alkyl, aryl, heteroaryl, alkenyl group can be substituted with one or more alkoxy, alkoxycarbonyl, aryloxy, aryloxycarbonyl, carbomyl, sulfamoyl, acylamino, sulfonylamino, halogen, ureido, hydroxy, carbamoyloxy, alkoxycarbonylamino, cyano, thiocyano, carboxy or sulfo groups etc..

B, as mentioned, is a ligand or ligands necessary to complete the coordination sphere of the metal ion. Each B may be the same or different, anionic or neutral and may be mono- or polydentate. Representative examples of B include water, acetate, pyridine; bipyridine; terpyridine (all optionally substituted). (B)p may also represent another polydentate formazan dye moiety thus forming a 1:2 metal:dye complex.

Just prior to the examples below, there is described a typical synthesis of a dye useful in the invention. Tables following the illustrative synthesis provide examples of specific dyes that are useful.

The elements of the invention use dyes which are metallized formazan dyes. The optical information recording medium comprises a light transmitting, typically pregrooved substrate, the metallized formazan dye light absorptive layer overlaying the substrate, a light reflective layer overlaying the light absorptive layer and a protective layer overlaying the light reflective layer. The recording process will produce marks of lower reflectivity than the unmarked areas of the disk when written and read with a diode laser emitting between 770 and 800 nm. It is preferred that the substituents on the dye molecule be selected so that the real part of the complex refractive index (N) of the unwritten light absorptive layer measured with 780 nm light source is not less than 1.8 and and the imaginary part (k) is not greater than 0.15.

The substrate may be any transparent material that satisfies the mechanical and optical requirements. Generally pregrooved with groove depths from 20 nm to 250 nm, groove widths 0.2 to 1 $\mu m$ and a pitch 1 to 2$\mu m$. The preferred material is polycarbonate, other materials are glass, polymethylmethacrylate and other suitable polymeric materials.

The preparation of the optical recording element of the invention is achieved by spin coating of the metallized formazan dye by itself, or with other dye or dyes or with addenda from a suitable solvent onto a transparent substrate. For coating, the metallized formazan dye with or without addenda is dissolved in a suitable solvent so that the dye is 20 or less parts by weight to 100 parts of solvent by volume. The dye recording layer of the element is then overcoated with a metal reflective layer under reduced pressure by resistive heating or a sputter method and finally overcoated with a protective resin.

Coating solvents for the dye recording layer are selected to minimize their effect on the substrate. Useful solvents include as alcohols, ethers, hydrocarbons, hydrocarbon halides, cellosolves, ketones. Examples of solvents are methanol, ethanol, propanol, pentanol, 2,2,3,3-tetrafluoropropanol, tetrachloroethane, dichloromethane, diethyl ether, dipropyl ether, dibutyl ether, methyl cellosolve, ethyl cellosolve, 1-methyl-2-propanol, methy ethyl ketone, 4-hydroxy-4-methyl-2-pentanone, hexane, cyclohexane, ethylcyclohexane, octane, benzene, toluene, and xylene. Other less desirable solvents include water and dimethylsulfoxide. Preferred solvents are hydrocarbon solvents and alcohol solvents since they have the least effect on the preferred polycarbonate substrates. Mixtures of solvents can also be used.

Useful addenda for the recording layer include stabilizers, surfactants, binders and diluents.

The reflective layer can be any of the metals conventionally used for optical recording materials. Useful metals can be vacuum evaporated or sputtered and include gold, silver, aluminium and copper and alloys thereof.

The protective layer over the reflective layer is similarly conventional for this art. Useful materials include UV curable acrylates.

One preferred protective layer is disclosed in commonly assigned U.S. Pat. application Ser. No. 815,020, filed Dec. 27, 1991 in the names of Kosinski and Amell. This application discloses a two layer structure in which the layer adjacent to the reflective layer is spin coated and the a second layer is screen printed.

An intermediate layer, to protect the metal layer from oxidation, can also be present.

The element of the invention can have prerecorded ROM areas as described in U.S. Pat. No. 4,940,618. The surface of the substrate can have a separate heat deformable layer as described in U.S. Pat. No. 4,990,388. Other patents relating to recordable CD type elements are U.S. Pat. Nos. 5,009,818; 5,080,946; 5,090,009; 4,577,291; 5,075,147; and 5,079,135.

The following preparatory example illustrate the preparation of a dye useful in the invention.

Synthesis of
1-(4-ethylphenyl-3-phenyl)-5-(3-methoxy-5-[N-t-butyl-sulfamoyl]-2-pyridyl)-formazan, 1:2 Ni complex

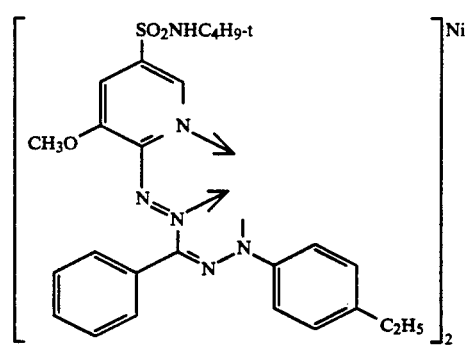

Dissolve 3.64 g (0.03 m) 4-ethylaniline in 50 ml of 3N HCl. Chill in ice and slowly add 2.28 g (0.033 m) sodium nitrite dissolved in 6 mL of water. Stir cold for 30 minutes. Meanwhile suspend 10.87 g (0.03 m) of the N-[3-methoxy-5-(N-t-butylsulfamoyl)-2-pyridylbenzaldehyde hydrazone in 200 mL of 2,6-lutedine. Warm slightly to dissolve and add to a solution of 3.72 g (0.015 m) Ni(OAc)2 in 300 mL methanol. A clear brown-yellow solution results. Stir 20 min at room temperature, then chill in an ice bath and slowly add the above diazonium salt solution. An immediate blue green color develops and some solid separates. After stirring for an additional 2 hours cold, add 2000 mL cold water and collect the dark blue solid. The crude dye is purified by recrystallization from methanol.

Yield: 14.4 g (92%) λ-max=646 nm ($\epsilon$=56,000 1/mol-cm) in dimethylacetamide. Structure was confirmed by mass spectrometry and combustion analysis.

In a similar manner, the following dyes were prepared. The structure of each was confirmed in a similar manner:

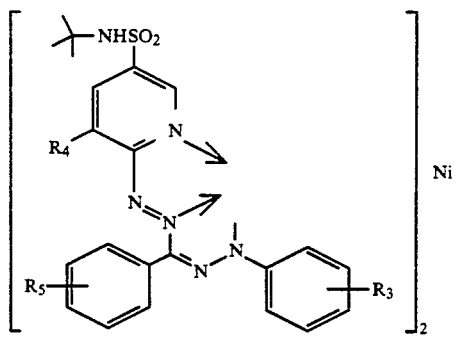

| Dye No. | $R_4$ | $R_5$ | $R_3$ |
|---|---|---|---|
| 1 | $CH_3O$ | m-$CH_3O$ | p-$CH_3CH_2$ |
| 2 | Cl | p-$CH_3O$ | p-$CO_2CH_2CH_3$ |
| 3 | $CH_3O$ | p-$CH_3O$ | p-$CO_2CH_2CH_3$ |
| 4 | $CH_3O$ | p-$CH_3O$ | p-$CH_3CH_2$ |
| 5 | $CH_3O$ | p-$CH_3O$ | o-$CH_3CH_2$ |
| 6 | $CH_3O$ | H | o-$CH_3CH_2$ |
| 7 | $CH_3$ | p-$CH_3O$ | p-I |
| 8 | $CH_3O$ | H | p-$CH(CH_3)CH_2CH_3$ |
| 9 | $CH_3O$ | p-$CH_3O$ | 3,4-$(CH_3)_2$ |
| 10 | $CH_3O$ | m-$CH_3$ | p-$(CO_2CH_2CH_3)$ |
| 11 | $CH_3O$ | H | p-$CH_3CH_2$ |
| 12 | $CH_3O$ | p-$CH_3O$ | m-$SO_3^-[CH_3(CH_2)_3]_4N^+$ |
| 13 | $CH_3$ | p-$CH_3O$ | p-$CH_3CH_2$ |

| | -continued | | |
|---|---|---|---|
| 14 | CH$_3$O | p-CH$_3$O | o-CO$_2$CH$_2$CH$_3$ |
| 15 | CH$_3$O | m-CH$_3$O | p-CH$_3$CH$_2$ |
| 16 | CH$_3$ | p-CH$_2$=CHCH$_2$O | p-CH$_3$CH$_2$ |

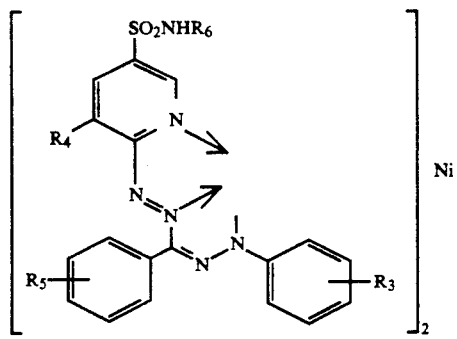

| Dye No. | R$_6$ | R$_4$ | R$_5$ | R$_3$ |
|---|---|---|---|---|
| 17 | C(CH$_3$)$_2$CH$_2$C(CH$_3$)$_3$ | Cl | p-CH$_3$O | p-CO$_2$CH$_2$CH$_3$ |
| 18 | C(CH$_3$)$_2$CH$_2$C(CH$_3$)$_3$ | CH$_3$O | m-CH$_3$ | p-CH$_3$CH$_2$ |
| 19 | C(CH$_3$)$_2$CH$_2$C(CH$_3$)$_3$ | CH$_3$O | p-CH$_3$O | p-CH$_3$CH$_2$ |
| 20 | C(CH$_3$)$_2$CH$_2$C(CH$_3$)$_3$ | CH$_3$O | p-CH$_3$O | o-CO$_2$CH$_2$CH$_3$ |
| 21 | CH$_2$CH(CH$_2$CH$_3$)—[(CH$_2$)$_3$CH$_3$] | CH$_3$O | m-CH$_3$ | p-CH$_3$CH$_2$ |
| 22 | CH$_2$CH(CH$_2$CH$_3$)—[(CH$_2$)$_3$CH$_3$] | CH$_3$O | m-CH$_3$ | p-CH$_3$CH$_2$ |
| 23 | C(CH$_3$)$_2$CH$_2$C(CH$_3$)$_3$ | CH$_3$ | p-CH$_3$O | p-CH$_3$CH$_2$ |
| 24 | C(CH$_3$)$_2$CH$_2$C(CH$_3$)$_3$ | CH$_3$ | p-CH$_3$O | p-CO$_2$CH$_2$CH$_3$ |
| 25 | CH(CH$_3$)CH$_2$OCH$_3$ | CH$_3$O | m-CH$_3$O | p-CH$_3$CH$_2$ |
| 26 | CH(CH$_3$)CH$_2$OCH$_3$ | CH$_3$O | m-CH$_3$O | o-CO$_2$CH$_2$CH$_3$ |

Dye 27

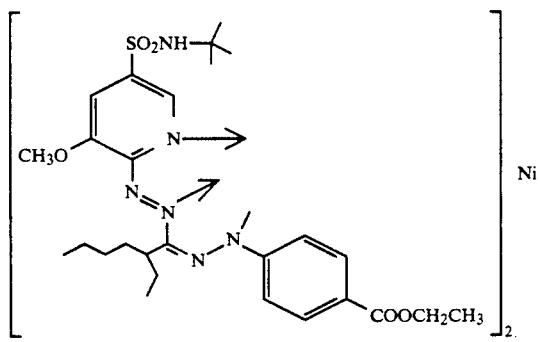

Dye 28

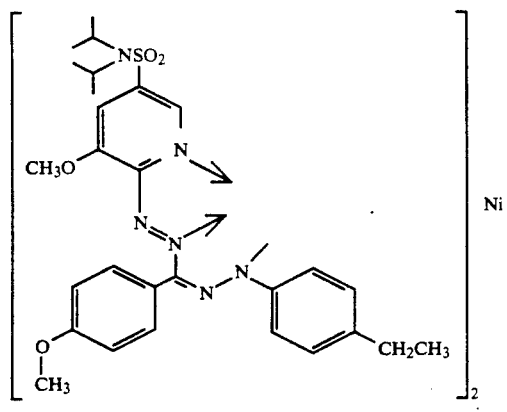

Dye 29

-continued
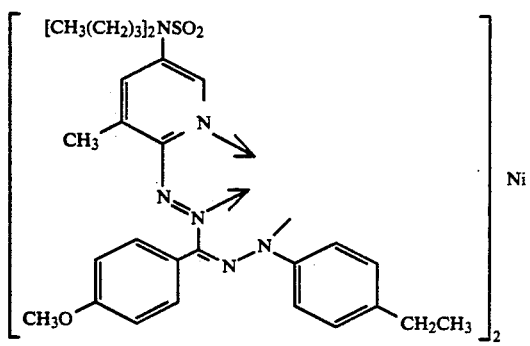
Dye 30
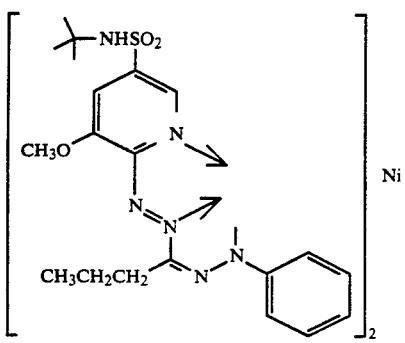
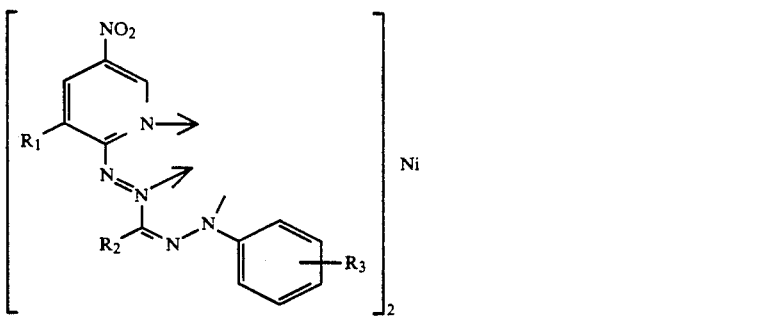
| Dye No. | R₁ | R₂ | R₃ |
|---|---|---|---|
| 31 | CH₃O | CH₃(CH₂)₃(CH₃CH₂)CH | p-CH₃CH₂ |
| 32 | H | 2-ethoxyphenyl (o-OCH₂CH₃) | p-CH₃CH₂(CH₃)CH |
| 33 | H | CH₃(CH₂)₃(CH₃CH₂)CH | p-CH₃CH₂(CH₃)CH |
| 34 | H | 3-methylphenyl with m-OC(O)C(CH₃)₃ | p-CH₃CH₂(CH₃)CH |
Dye 35

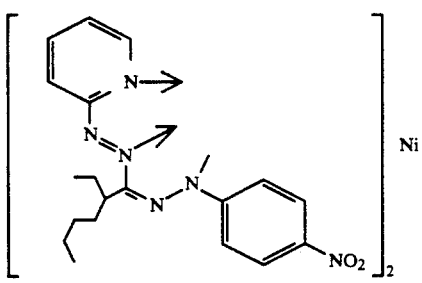

Dye 36

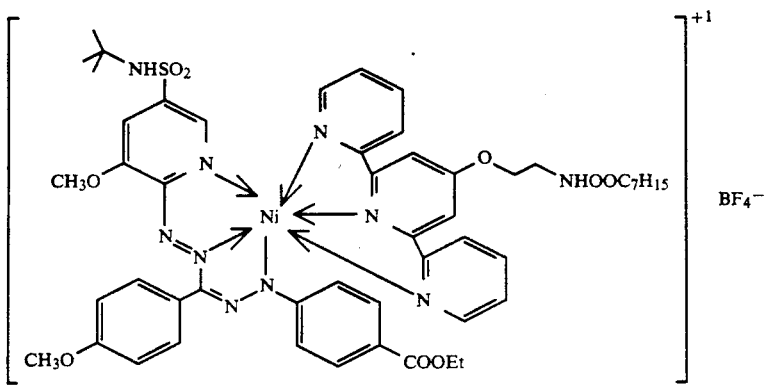

Dye 37

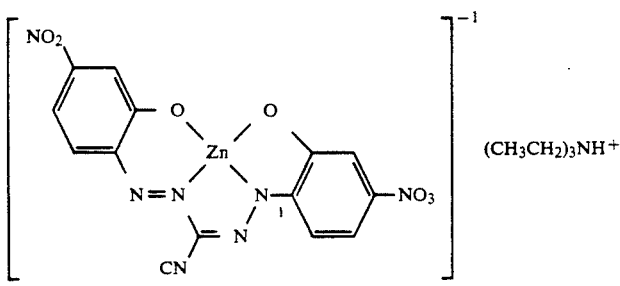

Dye 38

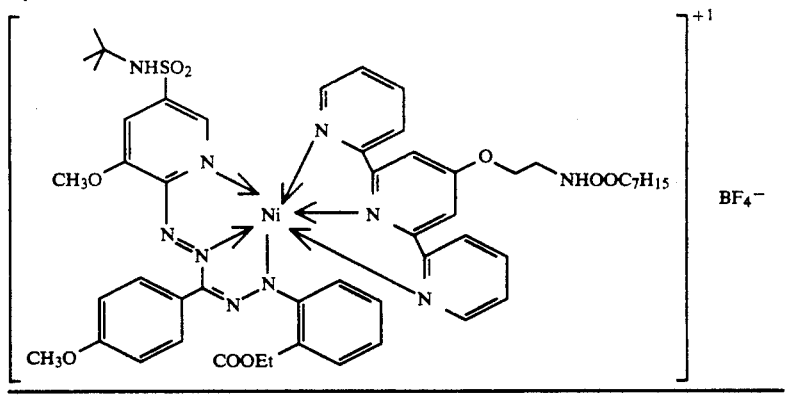

Preferred dyes are 1, 13, 15, 16, 23, 24, 25, 32, 34, 36 and 37 because of their excellent combination of CNR, index of refraction light stability and dark stability.

EXAMPLE 1 WITH DYE 1

A polycarbonate disc substrate having a thickness of 1.2 mm, an outer diameter of 120 mm and an inner diameter of 15 mm and having a spiral pregrooved formed on its surface with a width of 0.4 μm, and a depth of 0.08 μm and a pitch of 1.6 μm, was made by injection molding.

To form the light absorptive layer, 1 part by weight of dye 1 was dissolved in 40 parts of 2,2,3,3-tetrafluoropropanol by volume with stirring at room temperature for 1 hour. Then the solution was filtered through a 0.2

μm filter. The solution was coated on the surface of the substrate by spin coating to an optical density of 0.88 at 690 nm. It was dried at 80° C. for 15 minutes.

Then a gold reflective layer was deposited by resistive heating on the entire surface of the disc to about 1200 A thickness.

To protect the gold layer a lacquer (Daicure ™ SD-17) was applied by spin coating onto the gold layer an "H" bulb using a fusion system cure at 300 W/inch power for 15 seconds.

To test the optical disc thus obtained a test system consisting of an optical head with a 785 nm laser, a 0.5 NA lens, phase tracking, and ½ aperture focusing was used. The optics used circularly polarized light to reduce laser feedback effects. Recording and play back were carried out with the same laser at 5.6 m/s rotational speed. The read power was kept at 0.6 mw. The single frequency was recorded with a 3.5 micron mark length at 14 mW write power, through a 30 Kz filter, forming marks of lower reflectivity than the unmarked area when examined with a light source emitting between 770 nm and 800 nm. When the marks were read with the write laser CNR, (fundamental of the playback signal to noise) was 61 dB.

EXAMPLES

For these examples the same disk substrate solvent, solution concentration, filter, spin coater, drying conditions, gold deposition process and testing procedure was used as in the first example. The dye was coated on the grooved surface of the substrate to an optical density as indicated in the following table. Testing was in a similar manner and the conditions are listed in the table.

| Dye | Density | Overcoat Y or N | Write Power mW | CNR dB |
|---|---|---|---|---|
| 2 | 0.8 at 674 nm | N | 12 | 61 |
| 3 | 0.78 at 672 nm | N | 12 | 62 |
| 4 | 0.92 at 668 nm | N | 11 | 63 |
| 5 | 0.51 at 648 nm | N | 17 | 52 |
| 6 | 0.88 at 630 nm | N | 15 | 62 |
| 6 | 0.88 at 630 nm | Y | 16 | 53 |
| 7 | 0.77 at 666 nm | N | 12 | 61 |
| 8 | 0.95 at 656 nm | N | 14 | 63 |
| 9 | 0.73 at 666 nm | N | 13 | 63 |
| 10 | 0.86 at 670 nm | N | 12 | 62 |
| 11 | 0.84 at 648 nm | N | 12 | 62 |
| 12 | 0.74 at 674 nm | N | 14 | 53 |
| 13 | 0.82 at 684 nm | N | 16 | 63 |
| 14 | 0.79 at 676 nm | N | 12 | 61 |
| 15 | 1.25 at 690 nm | Y | 16 | 50 |
| 16 | 1.26 at 684 nm | Y | 14 | 57 |
| 17 | 0.50 at 690 nm | N | 16 | 50 |
| 18 | 0.79 at 656 nm | N | 16 | 55 |
| 19 | 0.83 at 700 nm | N | 14 | 58 |
| 20 | 0.72 at 690 nm | N | 14 | 57 |
| 21 | 0.75 at 700 nm | N | 14 | 61 |
| 22 | 0.76 at 688 nm | N | 12 | 51 |
| 23 | 0.80 at 684 nm | N | 16 | 64 |
| 24 | 0.84 at 684 nm | N | 12 | 59 |
| 25 | 1.0 at 656 nm | N | 14 | 65 |
| 25 | 1.0 at 656 nm | Y | 14 | 57 |
| 26 | 0.83 at 656 nm | N | 14 | 60 |
| 27 | 1.1 at 658 nm | N | 12 | 62 |
| 28 | 1.1 at 676 nm | N | 16 | 58 |
| 29 | 1.3 at 688 nm | N | 10 | 60 |
| 30 | 0.99 at 640 nm | N | 13 | 65 |
| 31 | 1.01 at 698 nm | N | 16 | 53 |
| 32 | 1.48 at 642 nm | Y | 14 | 62 |
| 33 | 0.76 at 698 nm | N | 18 | 49 |
| 34 | 1.36 at 672 | N | 16 | 64 |
| 35 | 1.15 at 668 nm | N | 10 | 44 |
| 36 | 0.70 at 626 nm | N | 16 | 48 |
| 37 | 0.71 at 694 nm | N | 16 | 53 |
| 38 | 1.15 at 672 nm | N | 16 | 55 |

EXAMPLE—LIGHT STABILITY

The dyes indicated in the table below were spin coated on polycarbonate slides about 5 cm square. Optical density measurements were taken 5 mm from the edge on two opposite sides of the slides with a diode array spectrophotometer between 400 nm and 800 nm wave lengths. One measured side of the slide was covered and the slide was exposed through the polycarbonate for sixteen days by a method in accordance with ANSI IT9.9-1990 "Stability of Color Photographic Images Section" 5 paragraph 5.6. (50Klux/ 16 days)

To calculate the percent optical density loss, the optical density after light exposure (AL) was substracted from the optical density before light exposure (BL). (The optical density was measured at the λmax.) The resulting value was divided by the optical density value before light exposure and multiplied by 100. This calculation was carried out with both the uncovered and covered (CAL) sides of the slides. Then, from the value obtained from the uncovered side, the value from the covered side was substracted and the resulting value was taken as the percent optical density loss due to light exposure.

$$\% \text{ Loss} = \left( \frac{BL - AL}{BL} \times 100 \right) - \left( \frac{BL - CAL}{BL} \times 100 \right)$$

In this test, a typical cyanine dye such as those described in U.S. Pat. No. 4,940,618, cited above, loses 100%. The results with the dynes useful in the invention are shown in the table below:

| Dye | Light Stability Table % Optical Density Loss After 16 days 50 Klux light Exposure |
|---|---|
| 1 | 1.6 |
| 9 | 4.8 |
| 10 | 5.0 |
| 12 | 0.0 |
| 13 | 0.0 |
| 18 | 13.1 |
| 19 | 9.8 |
| 20 | 3.7 |
| 21 | 9.5 |
| 24 | 7.0 |
| 23 | 6.3 |
| 24 | 0.0 |
| 25 | 0.0 |
| 26 | 17.0 |
| 27 | 6.9 |
| 28 | 3.6 |
| 29 | 0.0 |
| 31 | 17.4 |
| 36 | 4.5 |

Dark stability was also tested for several of the dyes. The test involved incubation at 80° C. and 80% R.H. for six weeks, described as follows:

The dyes were spin coated on polycarbonate slides about 5 cm square. Optical density measurements were taken before incubation with a diode array spectrophotometer between 400 nm and 800 nm. The slides were incubated for six weeks in a temperature humidity chamber set at 80° C. and 80% relative humidity with the slides placed, dye side up, in petri dishes with the tops slightly open. After the six weeks of incubation, optical measurements were taken. To determine the the percent optical density loss, the optical density value after incubation was substracted from the optical density value at µmax before incubation. The resulting number was divided by the optical density value before incubation and multiplied by one hundred to give the percent loss in optical density as a result of incubation.

The results are shown in the Table below:

Table of Dark Stability

| Dye | % Optical Density Loss After 6 weeks at 80° C./80% RH |
|---|---|
| 1 | 5.1 |
| 10 | 3.7 |
| 12 | 84.0 |
| 13 | 11.9 |
| 18 | 35.2 |
| 19 | 1.7 |
| 20 | 4.9 |
| 21 | 6.5 |
| 22 | 1.4 |
| 23 | 0.0 |
| 24 | 0.0 |
| 25 | 3.5 |
| 26 | 5.1 |
| 31 | 0.0 |

The invention has been described with particular reference to preferred embodiments thereof but it will be understood that modifications can be made within the spirit and scope of the invention.

What is claimed is:

1. A recordable optical element having a transparent substrate and on the surface of said substrate, a dye containing recording layer and a light reflecting layer, the improvement wherein said dye is a metallized formazan dye of the general structure:

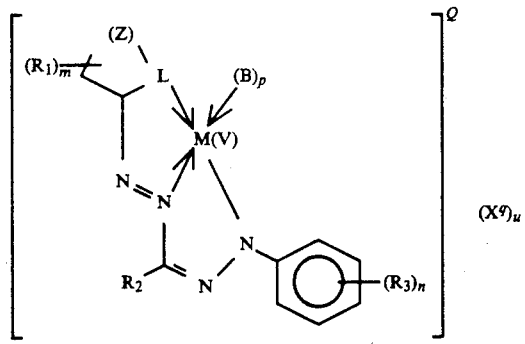

wherein:

Z are the atoms necessary to complete a 5 or 6 membered carbocyclic or heterocyclic ring;

each $R_1$ independently is a group selected from the group consisting of alkyl having about 1 to 20 carbon atoms; aryl having from about 6 to 10 carbon atoms; heteroaryl; alkenyl having from about 2 to 20 carbon atoms; halogen; thiocyano; cyano; nitro; sulfo; carboxy; hydroxy; alkoxy; aryloxy; hetaryloxy; alkylsulfonyl; arylsulfonyl; hetarylsulfonyl; arylazo; hetarylazo; alkoxycarbonyl; aryloxycarbonyl; alkoxycarbonylamino; aryloxycarbonylamino; alkoxycarbonyloxy; aryloxycarbonyloxy; alkylcarbonylamino; arylcarbonyloxy; hetarylcarbonyloxy; alkylcarbonylamino; arylcarbonylamino; hetarylcarbonylamino; mono- or dialkylaminocarbonyloxy; mono- or diarylaminocarbonyloxy; mono- or dihetarylaminocarbonyloxy; mono- or dialkylaminocarbonylamino; mono- or diarylaminocarbonylamino; mono- or dihetarylaminocarbonylamino; mono or di arylcarbamoyl; alkyl or aryl carbamoyl; mono- or di- alkylsulfamoyl; mono- or di-arylsulfamoyl; and alkylarylsulfamoyl;

$R_2$ represents an alkyl group having from 1 to about 20 carbon atoms; a heterocyclic group having from 1 to about 10 carbon atoms, an aromatic ring with H or $R_1$ substituents; CN; alkoxycarbonyl; $NO_2$; alkylsulfonyl; arylsulfonyl; carbamoyl; sulfamoyl;

each $R_3$ independently represents H or $R_1$ with the proviso that one of the $R_3$ groups may serve as a fourth ligand to the metal center, if located ortho to the azo linkage and chosen from O—, N—SO$_2$R$_4$ where R$_4$ can be an alkyl group with one to ten carbon atoms or aryl group with five to ten carbon atoms, $CO_2$—, $SO_3$— or —N=CH—;

m and n independently represent integers from 0 to 4;

L represents nitrogen or C—Y where Y represents a group capable of coordination to the metal ion such as O—, N—SO$_2$R$_4$ (where R$_4$ can be an alkyl group with one to ten carbon atoms or aryl group with five to ten carbon atoms) $CO_2$—, $SO_3$— or N=CH—, M represents a complexing metal such as Ni, Pd, Zn, Cu, etc.

V is the charge (valence) of the coordinating metal ion;

X is a counter ion group balancing the charge Q on the metal complex such as a sodium ion, chloride ion, tetraalkylammonium, tetrafluoroborate, hexafluorophosphate etc.

u is the number of counter ions required to balance the charge on the complex;

Q is the charge on the metal complex representing the difference between the metal valence (V) and the total anionic charge provided by the formazan dye and auxiliary ligand (B)p;

B is a ligand or ligands necessary to complete the coordination sphere of the metal ion and p is an integer from 0 to 3.

2. A recordable optical element according to claim 1 wherein L is nitrogen, Z represents the atoms necessary to complete a 6 membered ring, and at least one of $R_1$ represents nitro or an alkyl sulfamoyl group substituted with an alkyl group or an alkyl group containing an oxygen atom in the alkyl chain and another of $R_1$ is a group selected from the group consisting of alkyl, alkoxy and halogen; and $R_2$ is an alkyl group or an aromatic group optionally substituted with a group selected from consisting of alkyl and alkoxy or an alkyl group.

3. A recordable optical element according to claim 2 wherein said dye has the structure:

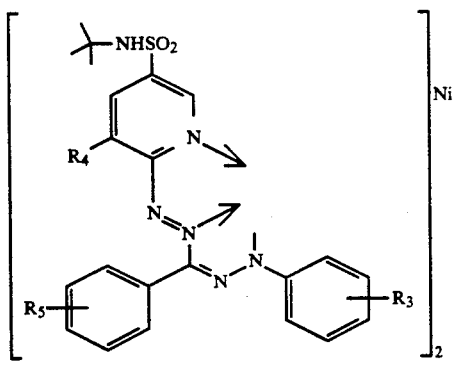

wherein R₄ is selected from the group consisting of alkyl, alkoxy and halogen; and R₅ is selected from the group consisting of hydrogen, alkyl, alkoxy and halogen.

4. A recordable optical element according to claim 2 wherein said dye has the structure:

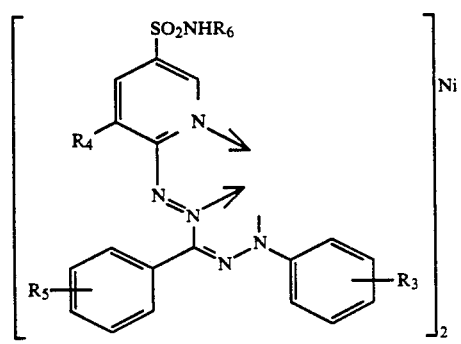

wherein R₄ is selected from the group consisting of alkyl, alkoxy and halogen; R₅ is selected from the group consisting of hydrogen, alkyl, alkoxy and halogen; and R₆ is an alkyl group or a alkyl group containing an oxygen atom in the alkyl chain.

5. A recordable optical element according to claim 2 wherein said dye has the structure:

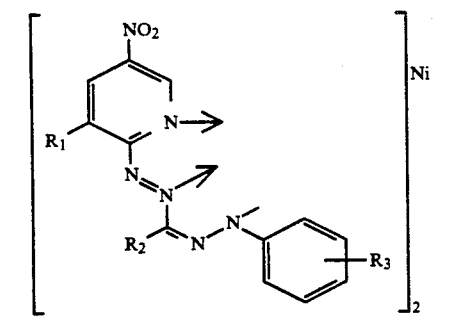

wherein R₁ is hydrogen or alkoxy, R₂ is an alkyl group or an aromatic group optionally substituted with a group selected from consisting of alkyl and alkoxy or an alkyl group and R₃ is an alkyl group.

6. A recordable optical elements according to claim 1 wherein said metallized formazan dye layer has a real part of the complex refractive index (N) of the unwritten light absorptive layer measured with 780 nm light source is not less than 1.8 and and the imaginary part (k) is not greater than 0.15.

7. A recordable optical element according to claim 1 wherein said dye is:

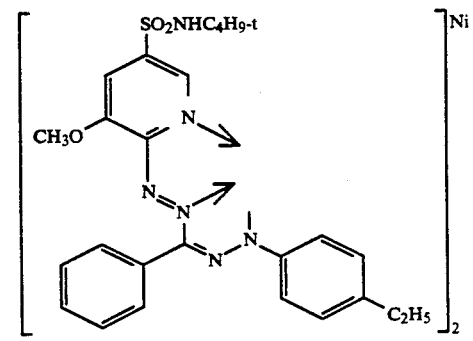

8. A recordable optical element according to claim 1 wherein said dye is:

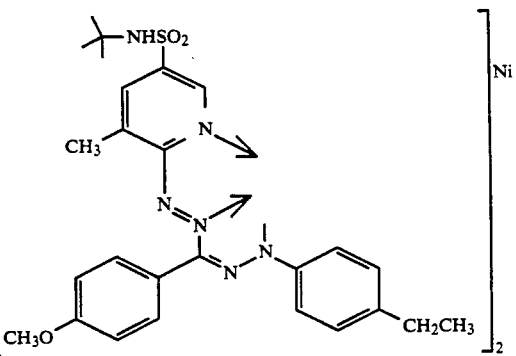

9. A recordable optical element according to claim 1 wherein said dye is:

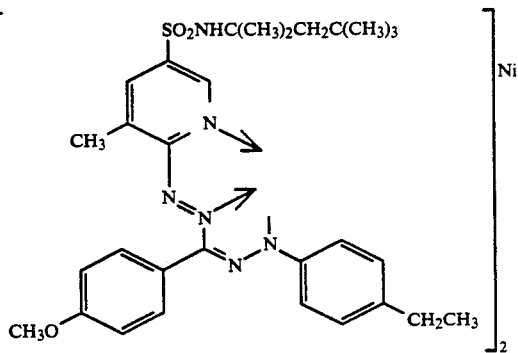

10. A recordable optical element according to claim 1 wherein said dye is:

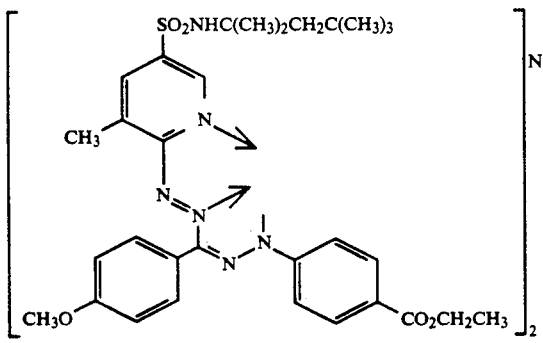

11. A recordable optical element according to claim 1 wherein said dye is:

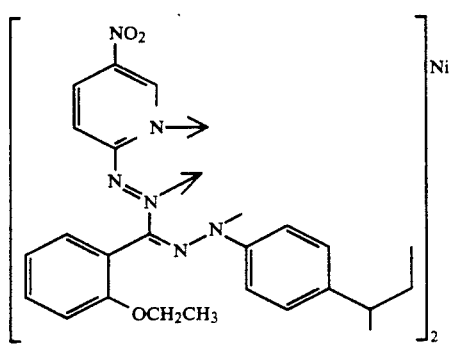

12. A recordable optical element according to claim 1 wherein said dye is:

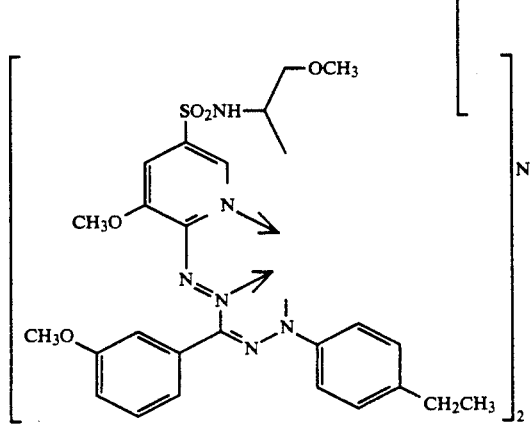

13. A recordable optical element according to claim 1 wherein said dye is:

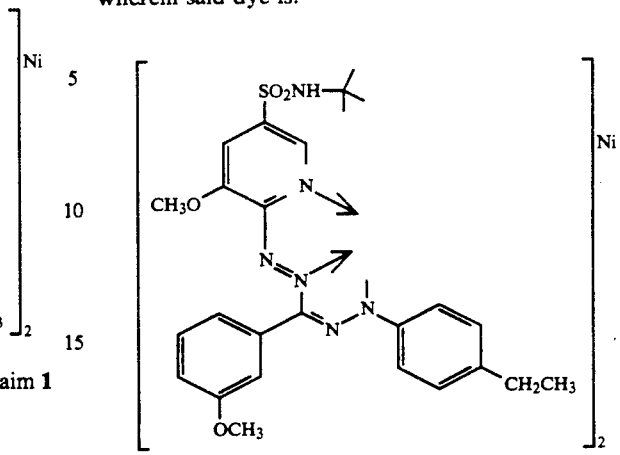

14. A recordable optical element according to claim 1 wherein said dye is:

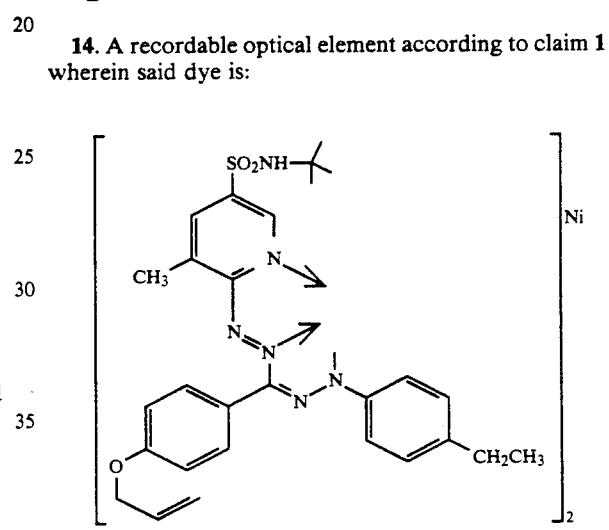

15. A recordable optical element according to claim 1 wherein said dye is:

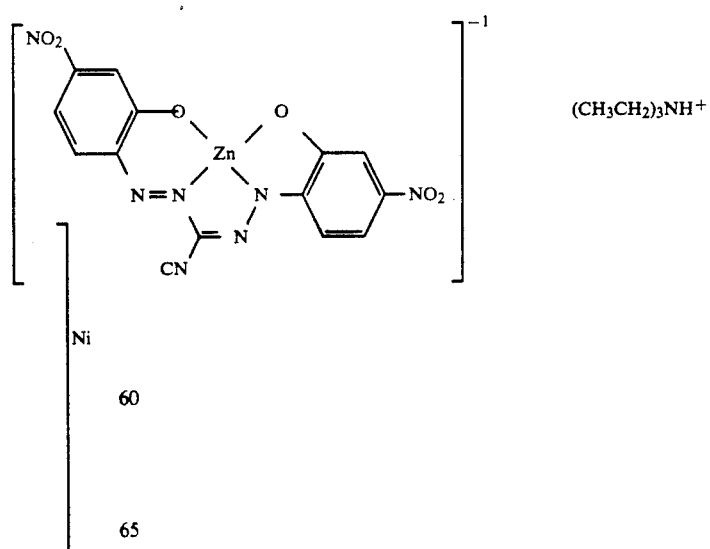

16. A recordable optical element according to claim 1 wherein said dye is:

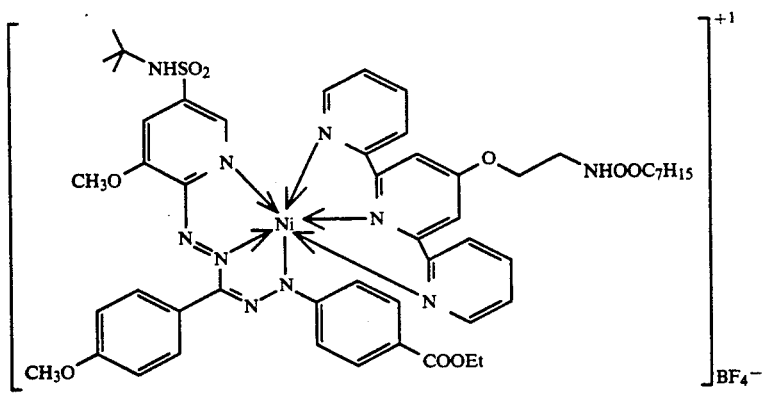
17. A recordable optical element according to claim 1 wherein said dye is:
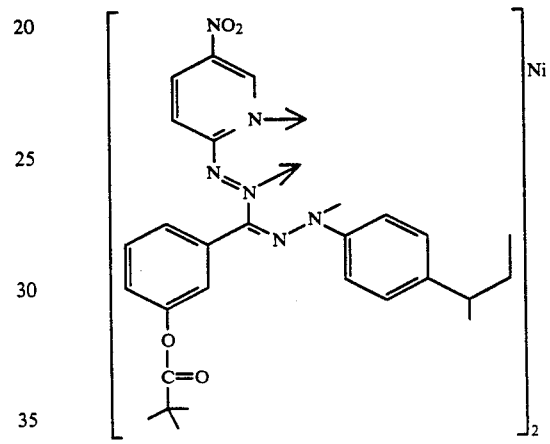
* * * * *